(12) United States Patent
Kerjariwal

(10) Patent No.: US 8,571,924 B2
(45) Date of Patent: Oct. 29, 2013

(54) HIGH PERFORMANCE PERSONALIZED ADVERTISEMENT SERVING BY EXPLOITING THREAD ASSIGNMENTS IN A MULTIPLE CORE COMPUTING ENVIRONMENT

(75) Inventor: Arun Kerjariwal, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 115 days.

(21) Appl. No.: 13/176,668

(22) Filed: Jul. 5, 2011

(65) Prior Publication Data

US 2013/0013392 A1      Jan. 10, 2013

(51) Int. Cl.
*G06Q 30/00*          (2012.01)

(52) U.S. Cl.
USPC .............................................. 705/14; 706/52

(58) Field of Classification Search
USPC ......................................................... 705/14
See application file for complete search history.

(56) References Cited

U.S. PATENT DOCUMENTS

2004/0199484 A1* 10/2004 Smith et al. ...................... 706/52
2012/0323674 A1* 12/2012 Simmons et al. .......... 705/14.41

OTHER PUBLICATIONS

Han, Wook-Shin and Lee, Jinsoo. "Dependency-aware reordering for parallelizing query optimization in multi-core CPUs" In Proceedings of the 35th SIGMOD international conference on Management of data, pp. 45-58, 2009.
Chandra Chekuri, Waqar Hasan and Rajeev Motwani. "Scheduling Problems in Parallel Query Optimization" In Proceedings of the fourteenth ACM SIGACT-SIGMOD-SIGART symposium on Principles of databases systems, pp. 255-265, 1995.
Ganguly, Sumit and Hasan, Waqar and Krishnamurthy, Ravi. "Query optimization for parallel execution" In Proceedings of the 1992 ACM SIGMOD international conference on Management of data. pp. 9-18. 1992.
A. A. Diwan and S. Sudarshan and D. Thomas. "Scheduling and Caching in Multi-Query Optimization" In Proceedngs of the ACM SIGMOD international conference Management of Data, 2006.
http://hardware.slashdot.org/story/11/04/06/0112222/Intel-Unveils-10-Core-Xeon-Processors.
Han, Wook-Shin and Kwak, Wooseong and Lee, Jinsoo and Lohman, Guy M. and Markl, Volker "Parallelizing query optimization" In Proceedings of VLDB, pp. 188-120, 2008.
http://techresearch.intel.com/ProjectDetails.aspx?ld=151.
http://tilera.com/.
http://software.intel.com/en-us/avx/.

* cited by examiner

*Primary Examiner* — Alvin L Brown
(74) *Attorney, Agent, or Firm* — Mauriel Kapouytian Woods LLP; James Woods; Yousef M. Mian

(57) ABSTRACT

A method, apparatus and computer program product for high performance advertisement serving by exploiting processor thread assignments in a processor having multiple threads. The method commences by receiving digital advertisements, an instance of the digital advertisement being associated with a plurality of decision trees (to relate a user to an advertisement), where the evaluation of a decision tree results in a tree score. After determining a number of cores within the processor, the decisions trees are assigned to processor cores or processor threads by iteratively assigning to a next one of the number of cores, a next decision tree, and iteratively accumulating a plurality of the tree scores to form a tree score subtotal. The tree score subtotals can be compared quantitatively to rank a first digital advertisement against a second digital advertisement, and a ranked advertisement displayed to a user. Some decision trees comprise demographic, behavioral and context quantifiers.

20 Claims, 13 Drawing Sheets

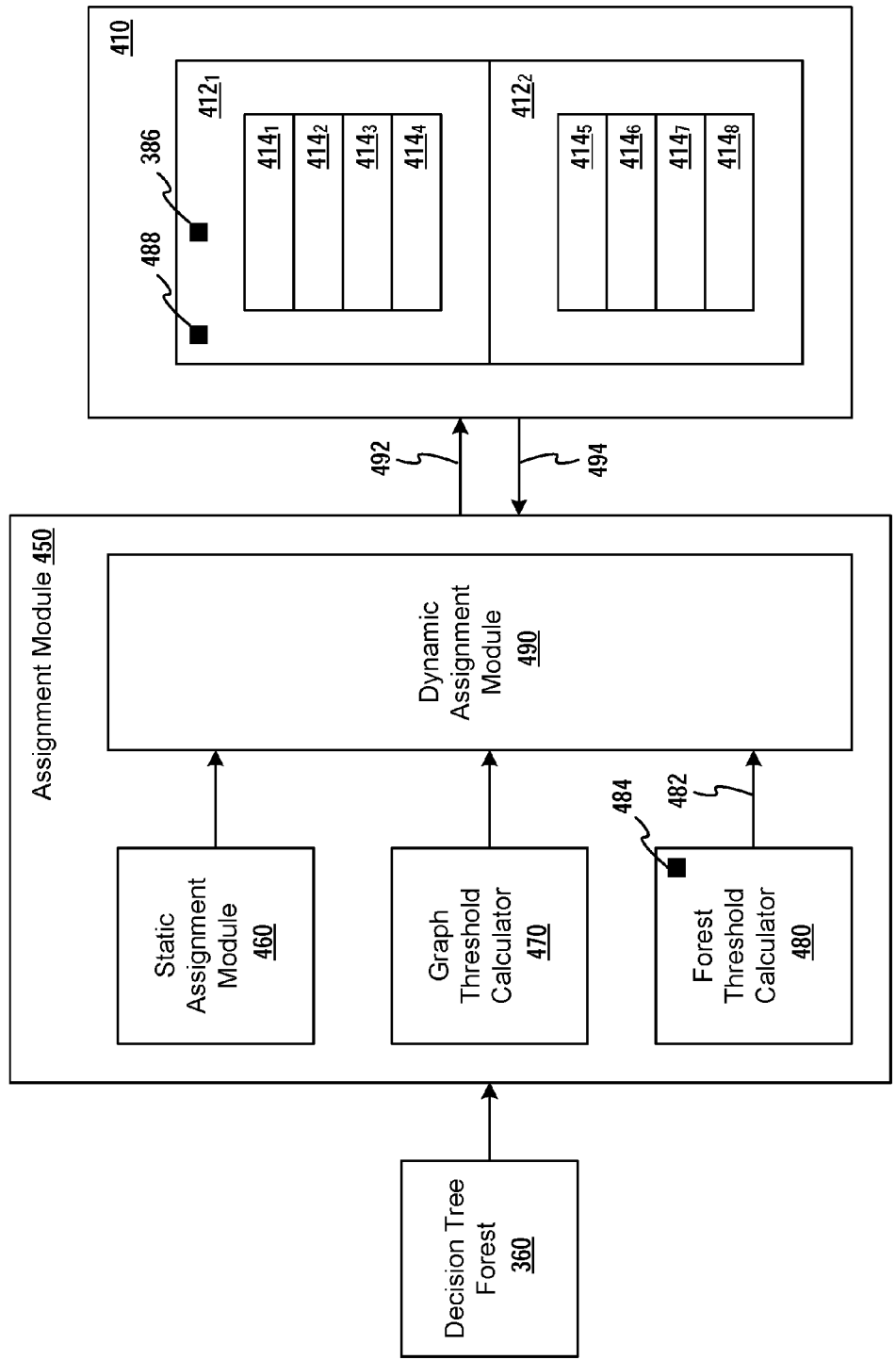

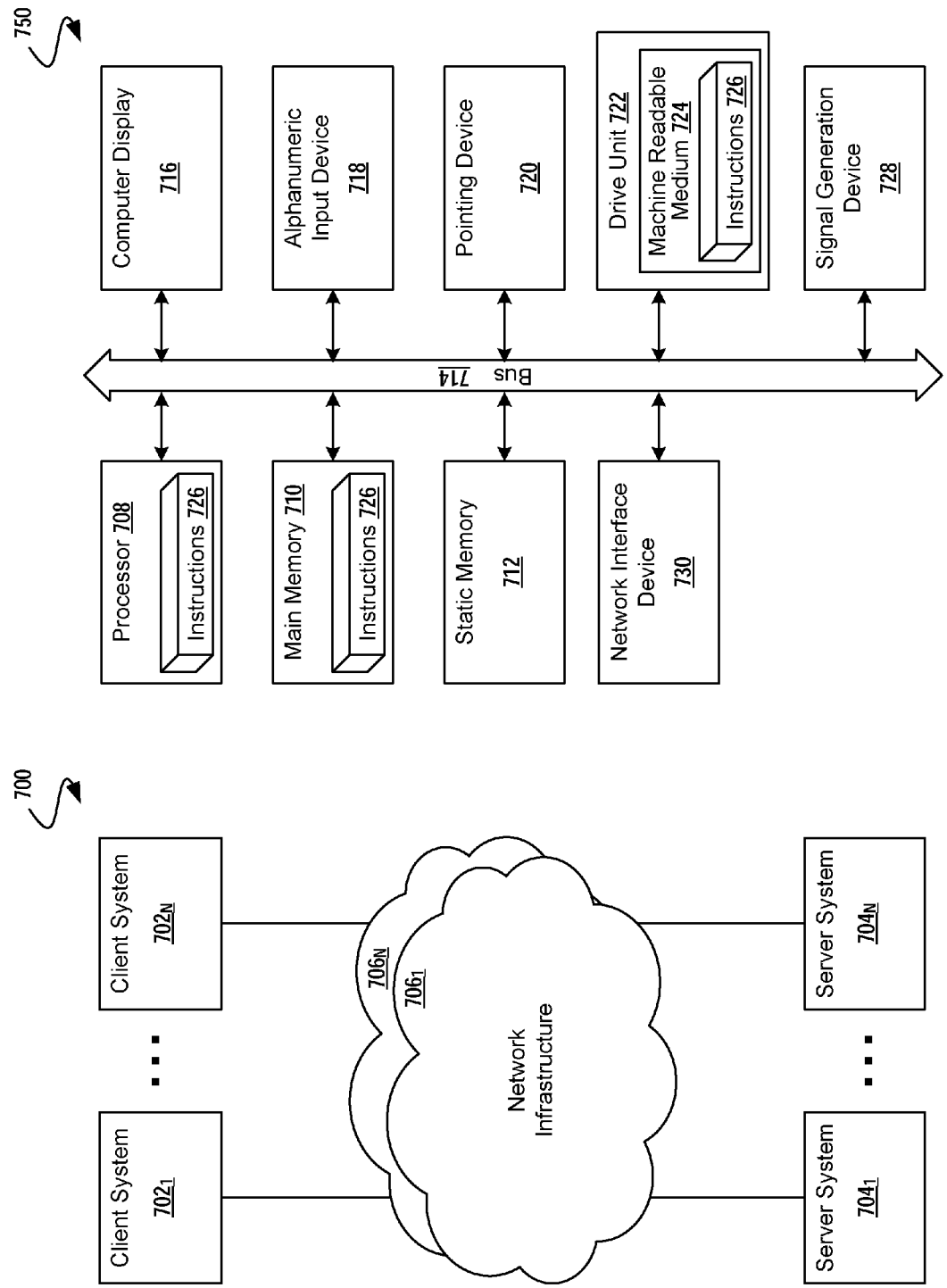

HIGH PERFORMANCE PERSONALIZED ADVERTISEMENT SERVING BY EXPLOITING THREAD ASSIGNMENTS IN A MULTIPLE CORE COMPUTING ENVIRONMENT

FIELD OF THE INVENTION

The present invention is directed towards digital advertising, and more particularly to improving the performance of serving digital advertisements.

BACKGROUND OF THE INVENTION

Serving a personally relevant digital advertisement to a specific user having specific demographics can be a compute-intensive process, yet users are unforgiving when it comes to latency expectations. Worse, there may be tens or hundreds (or thousands) of ads that are personally relevant to a particular user, and determining which one is most relevant can involve literally millions of evaluations and decisions. For example, perhaps hundreds (or thousands, or more) advertisers seek to display their digital advertisements over the Internet to reach individuals within a target set having very specific demographics (e.g. male, age 40-48, graduate of Stanford, living in California or New York, etc). Each time a web page is requested by a user via the Internet represents an impression opportunity to display an advertisement in some portion of the web page to the individual Internet user, and each impression opportunity can be satisfied by displaying a selected digital advertisement to the individual. The time duration between the individual's landing on a web page and the satisfaction of an impression opportunity is typically much less than one second. Yet, as digital media gains in popularity, the targeting of ever more specific demographics increases, as does the computing requirements to perform the ever more specific targeting so as to select and display a personally relevant digital advertisement to the user.

Certain legacy relevance models have been used, but such legacy models begin to fail when (1) the targeting requirements become more and more specific, and (2) tight real-time latency requirements are present. Some work has been done to exploit the availability of multiple computing platforms (e.g. multiple advertisement servers), however such work has been largely limited to exploiting parallelization at the server level, and has not exploited finer-grained parallelization opportunities presented by multiple core processors.

Thus, for these and other reasons, there exists a need for high performance personalized advertisement serving by exploiting thread assignments in multiple core computing environments.

SUMMARY OF THE INVENTION

A method, apparatus and computer program product for high performance advertisement serving by exploiting processor thread assignments in a processor having multiple threads. The method commences by receiving digital advertisements, an instance of the digital advertisement being associated with a plurality of decision trees (to relate a user to an advertisement), where the evaluation of a decision tree results in a tree score. After determining a number of cores within the processor, the decisions trees are assigned to processor cores or processor threads by iteratively assigning to a next one of the number of cores, a next decision tree, and iteratively accumulating a plurality of the tree scores to form a tree score subtotal. The tree score subtotals can be compared quantitatively to rank a first digital advertisement against a second digital advertisement, and a highest-ranked advertisement then displayed to a user. Some decision trees comprise demographic, behavioral and context quantifiers.

BRIEF DESCRIPTION OF THE DRAWINGS

The novel features of the invention are set forth in the appended claims. However, for purpose of explanation, several embodiments of the invention are set forth in the following figures.

FIG. 4C depicts a mapping of individual decision trees within a decision tree forest being assigned to a thread within a core, according to one embodiment.

FIG. 7 is a diagrammatic representation of a network including nodes for client computer systems, nodes for server computer systems, and nodes for network infrastructure, according to one embodiment.

DETAILED DESCRIPTION

Figure 1:
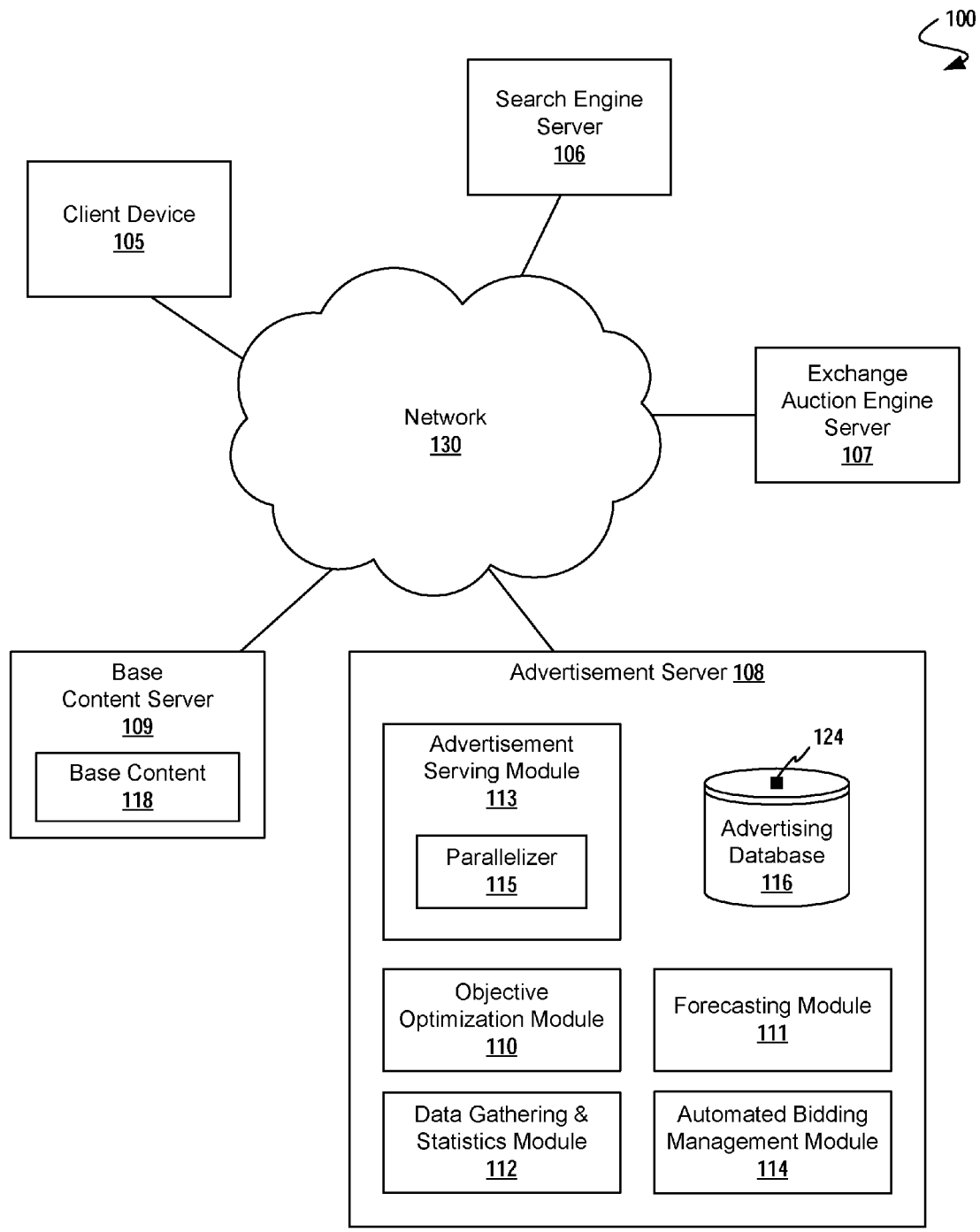
FIG. 1 depicts a digital advertising network environment including modules for delivering digital advertisements, according to one embodiment.

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

DEFINITIONS

Some of the terms used in this description are defined below (in alphabetical order) for easy reference. These terms are not rigidly restricted to these definitions. A term may be further defined by the term's use in other sections of this description.

"Ad" (e.g. ad, item and/or message) means a paid announcement, as of goods or services for sale, preferably on a network such as the internet. An ad may also be referred to as an item and/or a message.

"Ad call" means a message sent by a computer to an ad server for requesting a digital advertisement to be displayed.

"Ad click-through rate" (e.g. click-through rate) means a measurement of ad clicks per a period of time.

"Ad server" is a server that is configured for serving one or more ads to user devices. An ad server is preferably controlled by a publisher of a website and/or an advertiser of online ads. A server is defined below.

"Advertiser" (e.g. messenger and/or messaging customer, etc) means an entity that is in the business of marketing a product and/or a service to users. An advertiser may include, without limitation, a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Application server" is a server that is configured for running one or more devices loaded on the application server. For example, an application server may run a device configured for deducing shadow profiles.

"Click" (e.g. ad click) means a selection of an ad impression by using a selection device such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

"Conversion" (e.g. ad conversion) means a purchase of a product/service that happens as a result of a user responding to an ad and/or a coupon.

"Database" (e.g. database system, etc) means a collection of data organized in such a way that a computer program may quickly select desired pieces of the data. A database is an electronic filing system. In some instances, the term "database" is used as shorthand for a "database management system". A database may be implemented as any type of data storage structure capable of providing for the retrieval and storage of a variety of data types. For instance, a database may include one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include, without limitation, a software application such as Microsoft Word™ or a database; or hardware such as a laptop computer, a server, a display; or a computer mouse and/or a hard disk.

"Digital Context" means a web page or a display of digital content using a downloadable application.

"Impression" (e.g. ad impression) means a delivery of an ad to a user device for viewing by a user.

"Item" means an ad, which is defined above.

"Message" means an ad, which is defined above.

"Messaging" means advertising, which is defined above.

"Network" means a connection, between any two or more computers, that permits the transmission of data. A network may be any combination of networks including, without limitation, the internet, a local area network, a wide area network, a wireless network, and/or a cellular network.

"Publisher" means an entity that publishes, on a network, a web page, an downloadable application and/or other digital context having digital content and/or digital ads, etc.

"Server" means a software application that provides services to other computer programs (and their users) on the same computer or on another computer or computers. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Social graph" means the relationships between individuals communicating in an online environment and relative to all connections involved.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++ and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" means a device or multiple coupled devices. A device is defined above.

"User" (e.g. consumer, etc) means an operator of a user device. A user is typically a person who seeks to acquire a product and/or service. For example, a user may be a woman who is browsing Yahoo!™ Shopping for a new cell phone to replace her current cell phone. The term "user" may also refer to a user device, depending on the context.

"User device" (e.g. computer, user computer, client and/or server, etc) means a single computer or a network of interacting computers. A user device is a computer that a user may use to communicate with other devices over a network, such as the internet. A user device is a combination of a hardware system, a software operating system, and perhaps one or more software application programs. Examples of a user device include, without limitation, a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

"Web browser" means a software program that may display text or graphics or both, from digital contexts. Examples of a web browser include, without limitation, Mozilla Firefox™ and Microsoft Internet Explorer™.

"Web page" means documents written in a mark-up language including, without limitation, HTML (hypertext mark-up language), VRML (virtual reality modeling language), dynamic HTML, XML (extensible mark-up language), and/ or other related computer languages. A web page may also refer to a collection of such documents reachable through one specific internet address and/or through one specific website. A web page may also refer to any document obtainable through a particular URL (uniform resource locator). "Web portal" (e.g. public portal) means a website or service that offers a broad array of resources and services such as, for example, email, forums, search engines, and online shopping malls. The first web portals were online services, such as AOL, that provided access to the web. However, now, most of the traditional search engines (e.g. Yahoo!™) have transformed themselves into web portals to attract and keep a larger audience.

"Web server" is a server configured for serving at least one digital context to a display device. An example of a web server is a Yahoo!™ web server. A server is defined above.

"Website" means one or more digital contexts. A website preferably includes a plurality of digital contexts virtually connected by links or URL addresses to form a coherent group.

Motivation for High Performance Personalized Advertisement Serving in a Multiple Core Computing Environment Serving a personally relevant digital advertisement to a specific user having specific demographics can be a compute-intensive process, yet users are unforgiving when it comes to latency expectations. Worse, there may be tens or hundreds (or thousands) of ads that are personally relevant to a particular user, and determining which one is most relevant can involve literally millions of evaluations and decisions. For example, perhaps hundreds (or thousands, or more) advertisers seek to display their digital advertisements over the Internet to reach individuals within a target set having very specific demographics (e.g. male, age 40-48, graduate of Stanford, living in California or New York, etc). Each time a web page is requested by a user via the Internet represents an impression opportunity to display an advertisement in some portion of the web page to the individual Internet user, and each impression opportunity can be satisfied by displaying a selected digital advertisement to the individual. The time duration between the individual's landing on a web page and the satisfaction of an impression opportunity is typically much less than one second. Yet, as digital media gains in popularity, the targeting of ever more specific demographics increases, as does the computing requirements to perform the ever more specific targeting so as to select and display a personally relevant digital advertisement to the user. For serving advertisements in this regime, a scalable data infrastructure could enable extraction of deep insights into user data and can be expected to improve user engagement with respect to real time delivery of personalized ads. Improved user engagement can enhance monetization and enhance use models. What is needed, in part, is a highly efficient design and implementation of the ad-serving infrastructure. Herein are disclosed techniques to parallelize the digital advertising serving flow, thereby enabling the deployment of advanced ranking models while observing digital advertising serving response time (e.g. latency) guidelines.

Overview of Networked Systems for Digital Advertising

FIG. 1 depicts a digital advertising network environment 100 including modules for delivering digital advertisements. Such a digital advertising network environment implements a system whereby when an internet user, via a client device 105, renders a web page, possibly using a search engine server 106, the digital advertisement 124 is composited on the web page by one or more servers (e.g. a search engine server 106, a base content server 109, an advertisement server 108, etc) for delivery to a client device 105 over a network 130. Given this generalized advertisement delivery model, and using techniques disclosed herein, delivery of personally relevant online advertising can be practiced. Again referring to FIG. 1, an internet property (e.g. a publisher hosting the publisher's base content 118 on a base content server 109) might present content, possibly using an advertisement server 108 in conjunction with a data gathering and statistics module 112, and such content might inspire a user to perform a search (e.g. content related to track and field sports might inspire a user to search based on a query, "running shoes"), and the user might then invoke a search, possibly using a search engine server 106. The operator of the search engine service might then elect to bid in a market via an exchange auction engine server 107 in order to win a prominent spot on the displayed search results page.

In some embodiments, the digital advertising network environment 100 might host a variety of modules to provide digital advertising management and control operations (e.g. an advertisement serving module 113, an automated bidding management module 114, an objective optimization module 110, a forecasting module 111, a data gathering and statistics module 112) pertinent to serving advertisements to users. In particular, the modules, network links, algorithms, assignment techniques, serving policies, and data structures embodied within the digital advertising network environment 100 might be specialized so as to perform a particular function or group of functions reliably while observing latency, capacity and performance requirements. For example, an advertisement serving module 113 can perform I/O with a database of advertisements (see advertising database 116) and may further process and rank ads using a parallelizer 115. The parallelizer 115 can be configured so as to exploit parallelism in the operation of an ad ranking algorithm.

Figure 2:
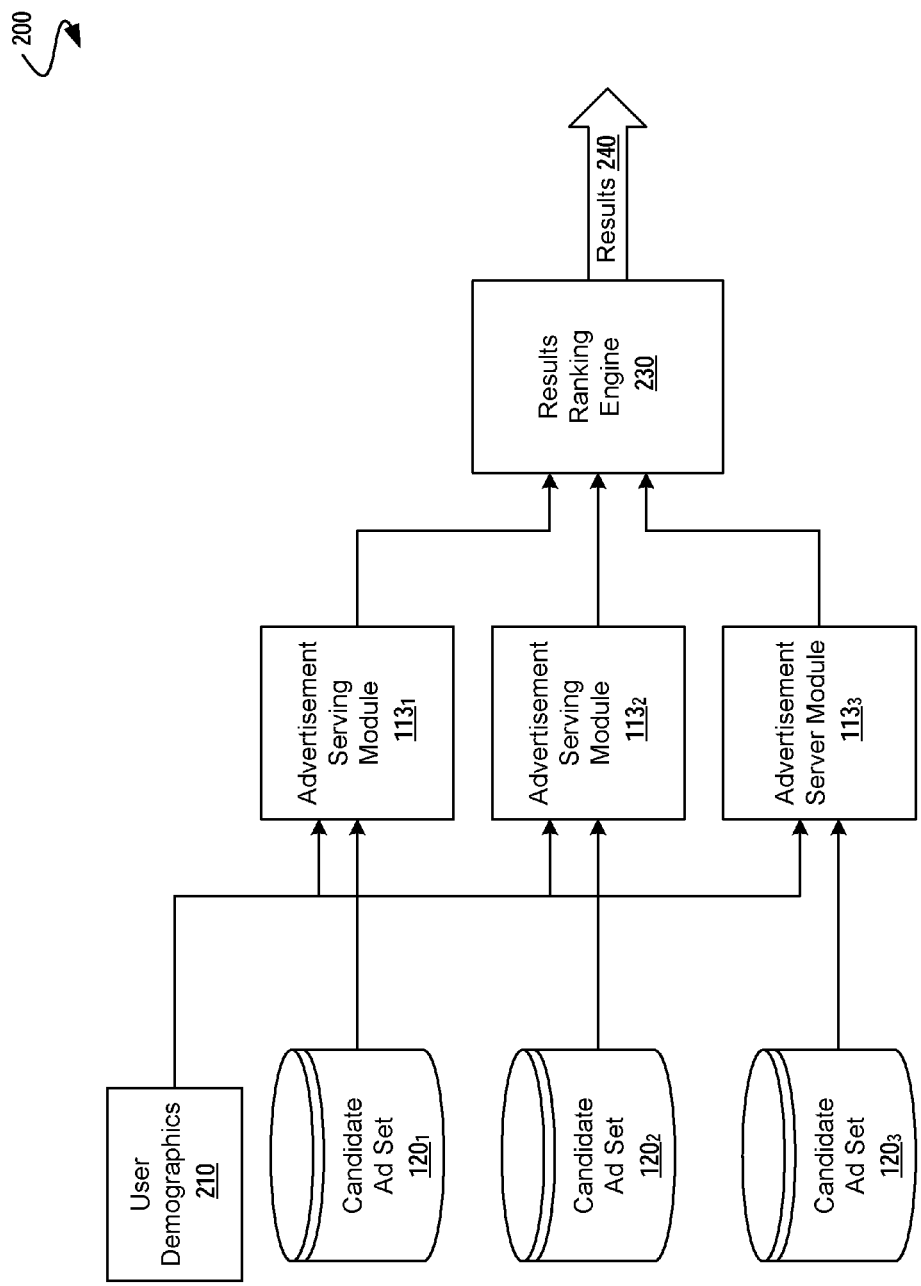
FIG. 2 depicts a data flow within a system for exploiting parallelism in advertisement serving using multiple servers, according to one embodiment.

FIG. 2 depicts a data flow within a system 200 for exploiting parallelism in advertisement serving using multiple servers, according to one embodiment. As previously suggested, it is possible to exploit the availability of multiple computing platforms (e.g. multiple advertisement servers) in certain embodiments of systems for high performance personalized advertisement serving. For example, given the demographics of a particular user (e.g. instances of user demographics 210), and given the task of finding the most relevant advertisement from a plurality of advertisements (e.g. from the advertising database 116) for presenting to the targeted user, an advertising database 116 can be divided up into a plurality of candidate ad sets (e.g. candidate ad set $120_1$, candidate ad set $120_2$, etc) and assigned to a plurality of advertisement serving modules such that and each of the advertisements falling into a given candidate ad set can be assigned to a processor within an advertising server (e.g. advertisement server 108 etc) for ranking those ads against the given instances of user demographics 210. The advertisement serving module can score against specific quantifiers, and subtotal the scores as disclosed herein. Then, the intermediate results (e.g. the results produced by the respective advertisement serving modules 113) can be combined and ranked using a results ranking engine 230, and the most relevant result or results (e.g. results 240) can thus be provided to another module or method step.

In some circumstances, but for the operations performed by a results ranking engine 230, the computation requirements to identify the most relevant result or results are nearly linear with respect to the number of advertisements ranked. However, fully considering the operations performed by a results ranking engine 230, the performance can become super-linear.

The deployment of a plurality of advertising servers (e.g. a plurality of instances of an advertisement server 108) is common in computing cloud environments (e.g. cloud farms). State-of-the-art cloud farms are populated by servers using multi-core processors (e.g. dual-core, quad-core, octal-core processors), yet server farm operators report low utilization of the available (e.g. multi-core) computing resources.

Still further, this low utilization (e.g. when considering the availability of unused or little used cores) is further exacerbated as the number of cores per processor increases. In some cases, specifically in situations with multi-core processors having hyper-threading enabled, some processors support dozens or scores of threads. Thus, more efficient exploitation of large scale hardware parallelism supported by such systems is desirable. The cloud operators, and more specifically ad server network operators, are motivated to seek higher utilization in order to (1) enhance power efficiency and (2) minimizing latency in ad serving while maintaining high relevance.

Disclosed herein are embodiments to exploit hardware parallelism at the thread level (aka thread-level parallelism, TLP), and specific techniques are disclosed for parallelizing ad serving operations using TLP.

Figure 3A:
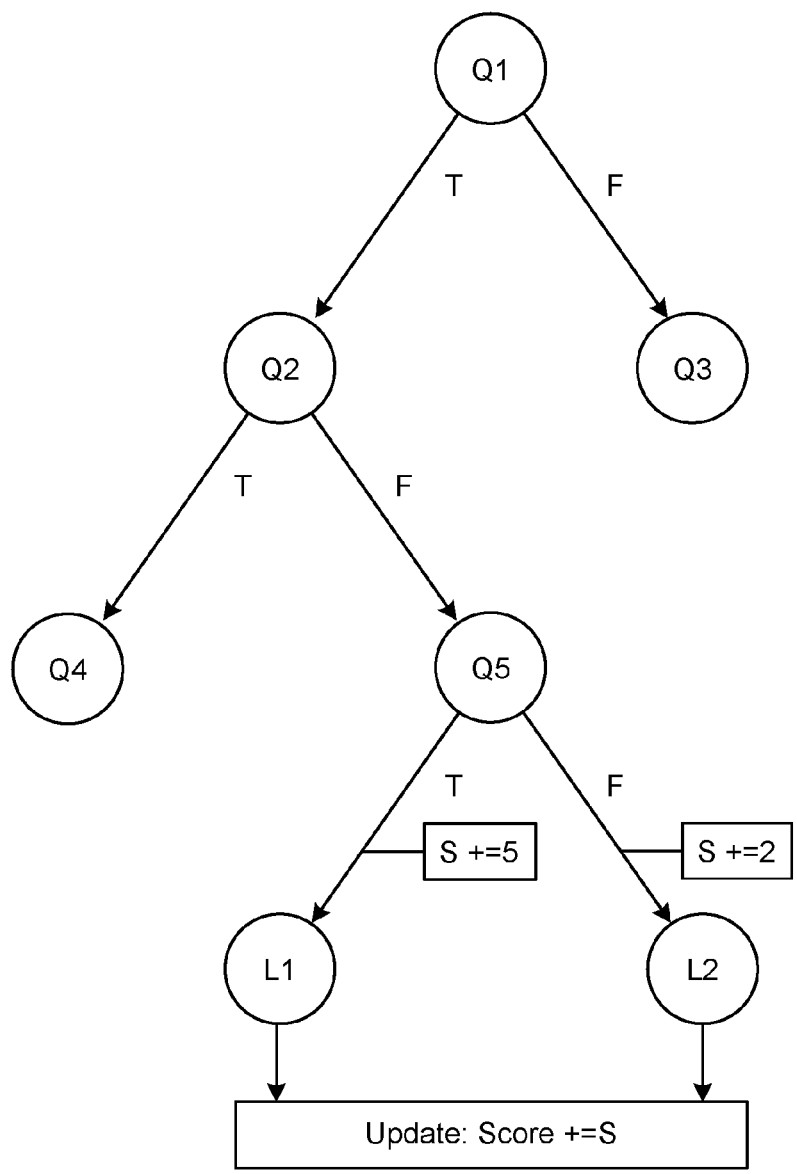
FIG. 3A depicts a decision tree for use in scoring the relevance of an ad to a set of user demographics, according to one embodiment.

FIG. 3A depicts a decision tree for use in scoring the relevance of an ad to a set of user demographics. As shown, the demographic decision tree 300 is a graph with nodes (the nodes representing quantifiers) and edges representing possible traversal from one node to another node in the graph. Such a decision tree is used in machine learned algorithms, and is used in various operations to score the relevance of an ad to a set of user demographics. That is, one or more decision trees can be associated with an ad, and the relevance of the associated ad to a user can be based on the score of the graph (as applied to the user).

Referring to the nodes labeled Q1, Q2, . . . Q5, each of the nodes so labeled can represent a quantifier $Q_N$, and a quantifier can be a Boolean test, or a measurement, or any other test for that matter. For example, the quantifier Q1 might represent the query, "is the user located in the state of California". If true, the left branch is taken, and the quantifier Q2 is evaluated. In turn, and continuing this example, the quantifier Q2 might represent the query, "is the user male". If false, the right branch is taken, and the quantifier Q5 is evaluated. In turn, and continuing this example, the quantifier Q5 might represent the query, "is the user the over 21 years of age". If true, the left branch is taken; if false, the right branch is taken. Still following this example, if the user were identified as "over 21 years of age", then the next traversal would land at the node labeled L1, which is a leaf node. Upon traversing a decision tree, and upon reaching a leaf node, the graph is said to have been evaluated (though there are other ways disclosed herein to evaluate a decision tree without reaching a leaf node). In this example, the action taken upon evaluating the quantifier Q5 is to add 5 points upon traversing to node L1 (and only 2 points in the case that the traversal traverses to node L2). Intuitively, this represents the case that the advertisement is deemed to be more targeted to "female, over 21, in California" than it is deemed to be more targeted to "female, 21 or under, in California". Conversely, the depicted graph suggests that the ad associated with the demographic decision tree 300 is not intended to be targeted to men, or to users outside of California.

Of course, the foregoing is merely an example. Moreover, it is often the case that an ad is scored based on a plurality of inter-related criteria (e.g. as in the foregoing example), and in some cases an ad is scored using a plurality of decision trees.

Figure 3B:
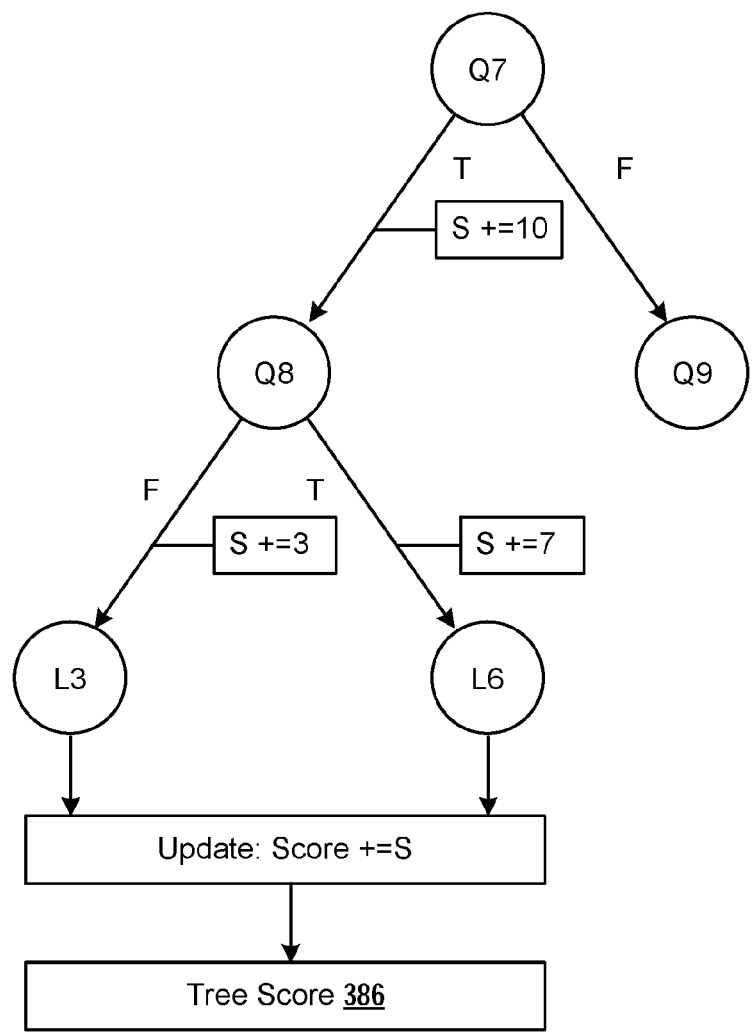
FIG. 3B depicts a decision tree for use in scoring the relevance of an ad to a set of user behaviors, according to one embodiment.

FIG. 3B depicts a decision tree for use in scoring the relevance of an ad to a set of user behaviors. As shown, the behavior decision tree 320 is a graph, with nodes (the nodes representing quantifiers) and edges representing possible traversal from one node to another node in the graph. That is, one or more decision trees can be associated with an ad, and the relevance of the associated ad is based on the tree score 386 of the graph as applied to a user.

Referring to the nodes labeled Q7, . . . Q9, each of the nodes so labeled can represent a quantifier $Q_N$, and a quantifier can be a Boolean test, or a measurement, or any other test for that matter. For example, the quantifier Q7 might represent the query, "is the user using a mobile device". If true, the left branch is taken, and the quantifier Q8 is evaluated. In turn, and continuing this example, the quantifier Q8 might represent the query, "is the user's mobile device a smart phone". If true, the right branch is taken, and the next traversal would land at the node labeled L6. In this example, the action taken upon encountering the traversed edge from quantifier Q7 to quantifier Q8 includes the action "S+=10". Thus, evaluating this behavior decision tree 320 as per the foregoing example, includes the action to add 10 points upon traversing to Q8, and adding another 7 points upon traversing to leaf node L6. Intuitively, this represents the case that the advertisement is deemed to be more targeted to users on smart phones than it is to users on mobile devices other than smart phones.

Of course, the foregoing is merely an example. As is earlier indicated, it is often the case that an ad is scored using a plurality of decision trees. A plurality of decision trees is known as a decision forest.

Figure 3C:
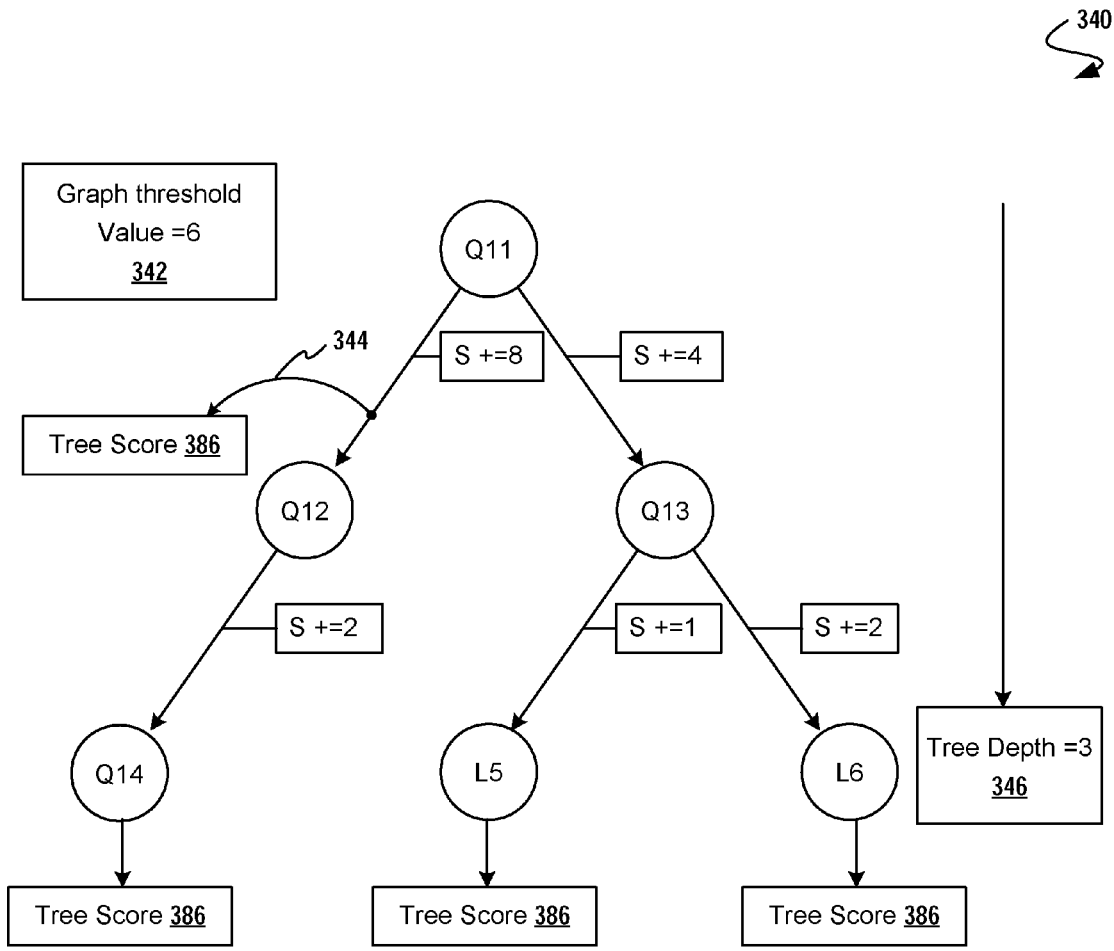
FIG. 3C depicts a decision tree for use in scoring the relevance of an ad to a set of user contexts, according to one embodiment.

FIG. 3C depicts a decision tree for use in scoring the relevance of an ad to a set of user contexts. As shown, the context decision tree 340 is a graph with nodes (the nodes representing quantifiers) and edges representing possible traversal from one node to another node in the graph. That is, one or more decision trees can be associated with an ad, and the contexts of the associated ad are based on the tree score of the graph as applied to a user.

Referring to the nodes labeled Q11, . . . Q14, each of the nodes so labeled can represent a quantifier $Q_N$, and a quantifier can be a Boolean test, or a measurement, or any other test for that matter. For example the quantifier Q11 might represent the query, "is the user viewing content related to sports". If so, the appropriate branch is taken, and the next quantifier is evaluated. In some cases, and as is shown in FIG. 3C, a graph can be evaluated without being fully traversed. Such a situation can occur when the graph is associated with a threshold value, and the threshold value is reached or exceeded during graph traversal.

In this example, the graph threshold value 342 is given as having a value of 6 (as shown). During traversal of the graph (e.g. context decision tree 340), it might be that the traversal passes over the edge between Q11 and Q12, thus adding 8 points to the tree score for this graph. At this moment in the traversal of the graph, the threshold value is exceeded, and the traversal can be terminated at such a time (see early exit 344). In the alternative, namely traversal from Q11 to Q13, only 4 points are added, which does not equal or exceed the tree score threshold, thus Q13 would be evaluated and proceed to either leaf node L5 or leaf node L6.

As is depicted, a decision tree has a tree depth 346. As shown, the tree depth is equal to the depth of the graph, for example the longest length of a non-looping walk from a root node to a leaf node.

Figure 3D:
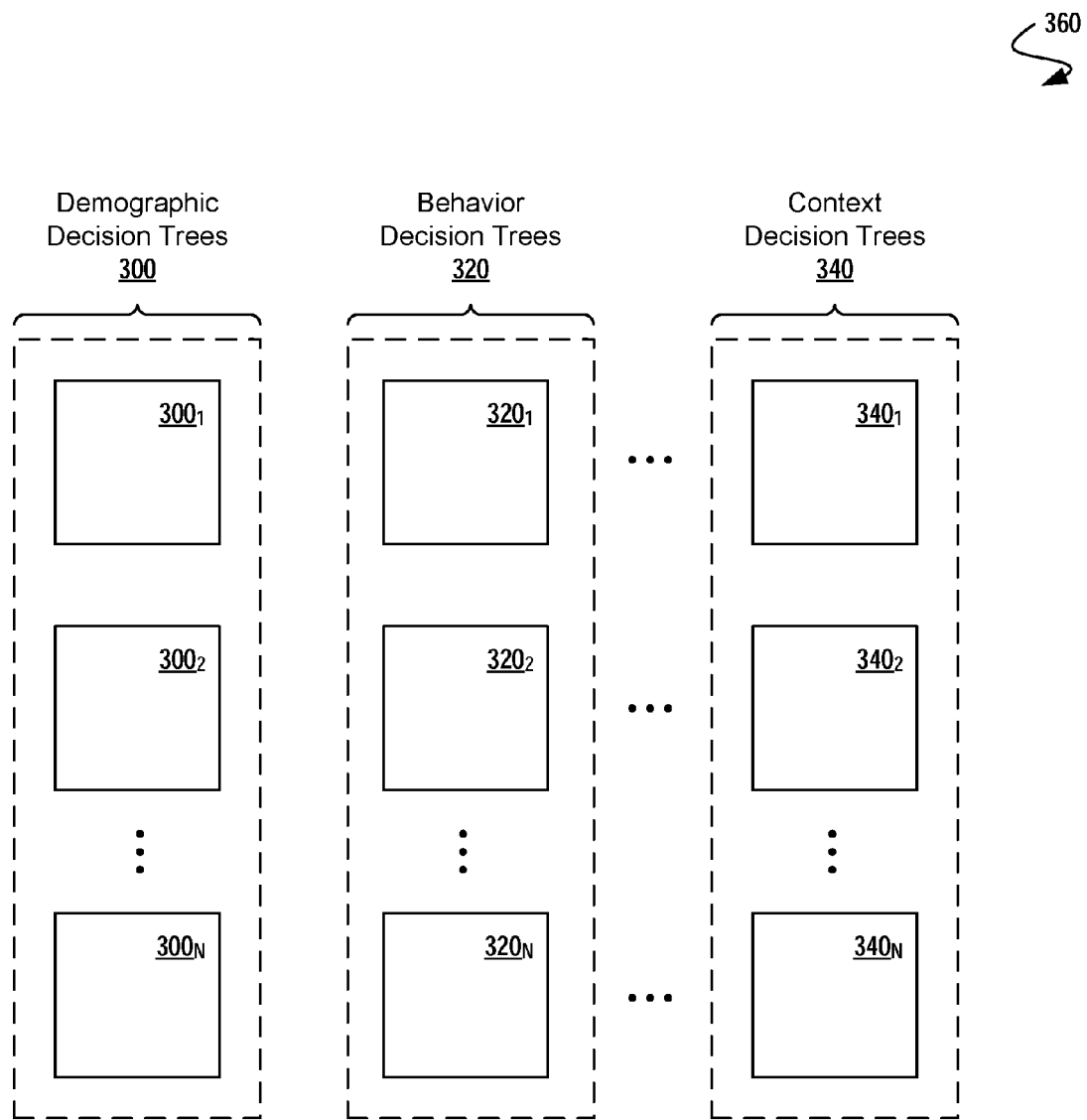
FIG. 3D depicts a decision tree forest for use in scoring the relevance of an ad to a user, according to one embodiment.

FIG. 3D depicts a decision tree forest for use in scoring the relevance of an ad to a user. As shown, the decision tree forest 360 includes a plurality of decision trees (e.g. $300_1, \ldots 300_N$, $320_1, \ldots 320_N$, $340_1, \ldots 340_N$, etc). The ad score of an ad as it related to the relevance of a particular user can be determined quantitatively by summing all of the tree scores from evaluations of all of the graphs (e.g. demographic decision trees 300, behavior decision trees 320, etc).

As is presently discussed, the latency incurred in the evaluation of all of the graphs from a decision tree forest 360 (and then ranking the scored ads) can be reduced by parallelizing the evaluation operations. The evaluation operations can be grouped by decision graph, and the traversal of a decision graph (and performing the constituent operations) can be assigned to a particular process or thread. That is, any individual decision graph from a plurality of decision graphs in a particular decision tree forest can be assigned to a corresponding thread.

Using pseudo-code for describing computer operation, A high level outline of attributing an ad score to an ad can be given as follows:

```
for each decision tree
    Traverse the tree until a leaf node is reached
    Update the score during traversal
        Concurrently, if the score reaches or exceeds a threshold
    value then
            break;//early exit
end for
```

Thus, computation of an ad score of a digital advertisement 124 may entail traversing a sequence of quantifier nodes. Upon reaching a leaf node of a decision tree (or upon reaching or exceeding a graph threshold value 342), the ad score of the advertisement under consideration is updated. The aggregated score obtained after scoring a plurality of individual decision trees (e.g. traversing the decision trees in the decision tree forest 360) can then be used with other aggregated scores to rank the advertisement against other advertisements.

Figure 4A:
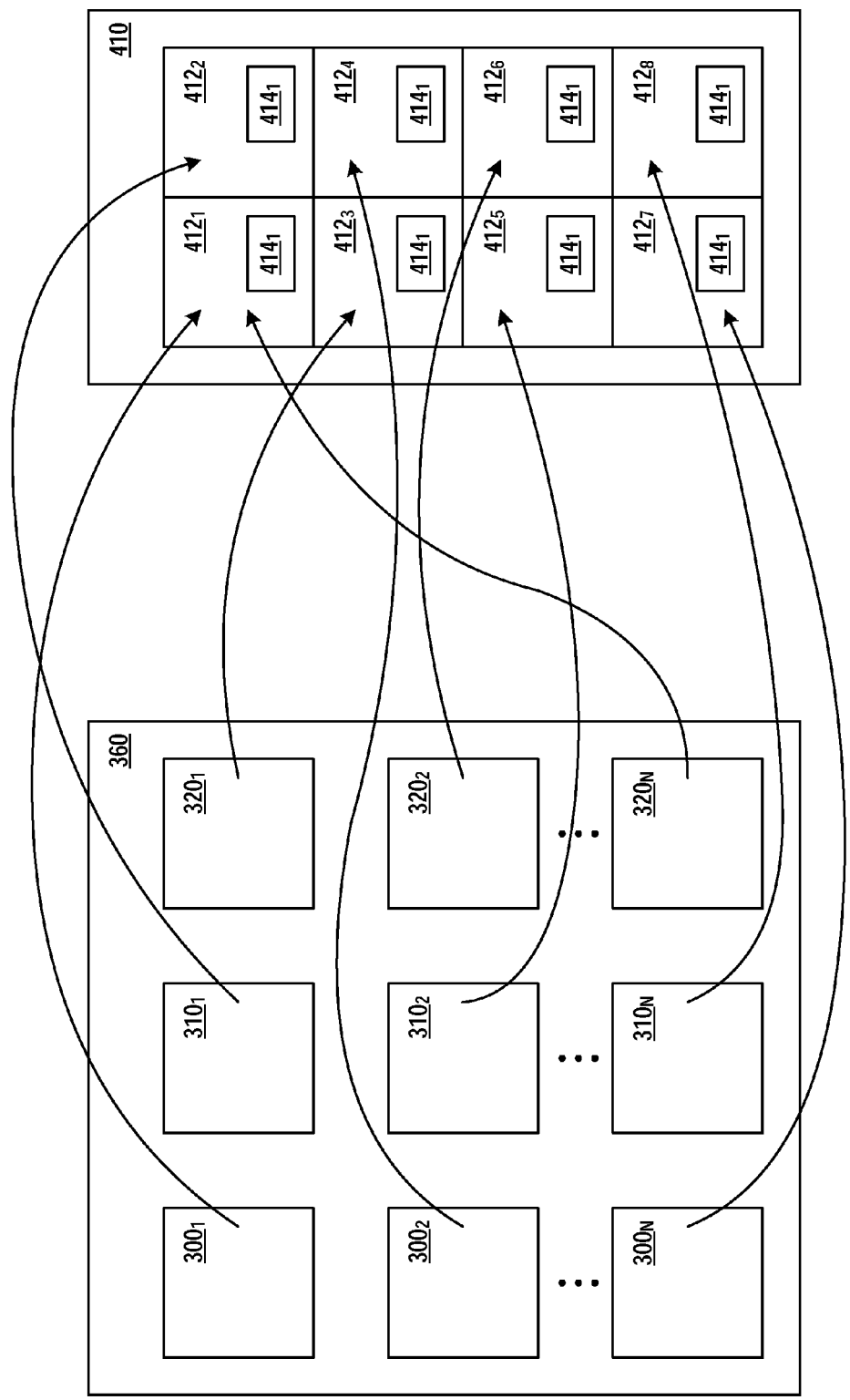
FIG. 4A depicts a mapping of individual decision trees being assigned to a corresponding core, according to one embodiment.

FIG. 4A depicts a mapping of individual decision trees being assigned to a corresponding core. As shown a decision tree forest 360 includes a plurality of trees (e.g. $300_1 \ldots, 320_1 \ldots, 340_1 \ldots$, etc), possibly corresponding respectively to demographic decision tree $300_1$, behavior decision tree $320_1$, and context decision tree $340_1$. The depiction of FIG. 4A includes a processor 410 and an array of eight cores 412. Also shown is a particular mapping of individual decision trees being assigned to a corresponding core. In the example given, each successive decision tree is assigned to the next available core.

In some embodiments, a processor 410 can include multiple instances of a core 412, where each core can process a plurality of threads 414.

Figure 4B:
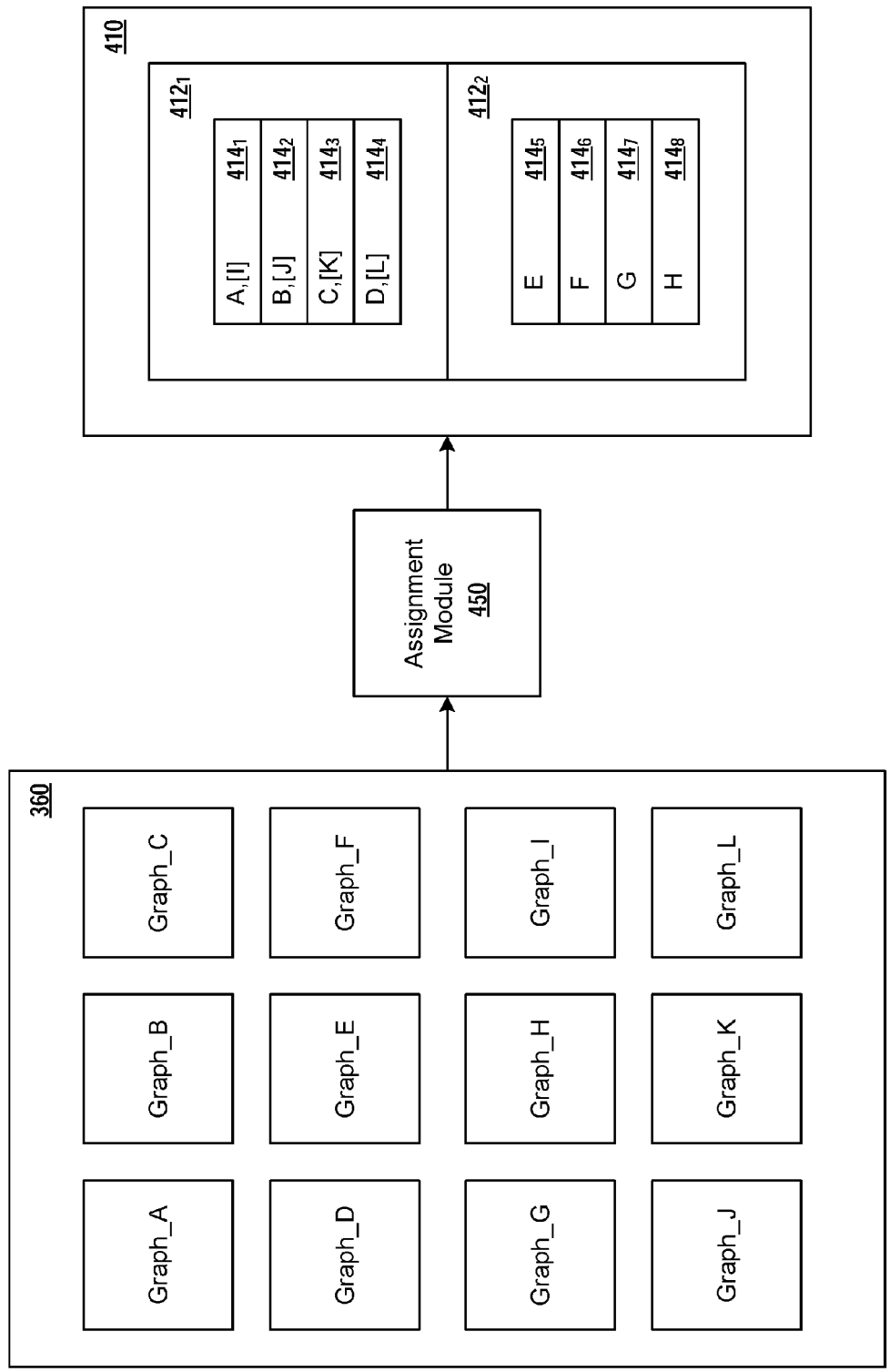
FIG. 4B depicts a mapping of individual decision trees being assigned to a corresponding thread within a core, according to one embodiment.

FIG. 4B depicts a mapping of individual decision trees being assigned to a corresponding thread within a core. As shown, a decision tree forest 360 includes a plurality of trees (e.g. $300_1 \ldots 300_N$, $320_1 \ldots 320_N$, $340_1 \ldots 340_N$, etc), corresponding respectively to demographic decision trees $300_1 \ldots 300_N$, behavior decision trees $320_1 \ldots 320_N$, and context decision trees $340_1 \ldots 340_N$. Of course, the shown types of decision trees are merely examples, and any sorts of decision trees are reasonable and contemplated. Moreover, a decision tree need not follow any particular taxonomy—a decision tree can comprise quantifiers based on any feature of any digital advertisement, and/or any feature of any user or user context.

The depiction of FIG. 4B includes a processor 410 and an array of two cores 412. Also shown is a particular mapping of individual decision trees being assigned to a corresponding thread within a core 412 (e.g. thread $414_1$, etc). In the example given, each successive tree is assigned to the next available thread (e.g. thread $414_2$, etc) within a core. As shown, the assignment module rotates through the graphs (e.g. Graph_A, Graph_B, etc), and commutates them to the next successive available thread.

FIG. 4C depicts a mapping of individual decision trees (within a decision tree forest 360) being assigned to a corresponding thread within a core. An assignment module 450 is shown to be comprised of a static assignment module 460, a graph threshold calculator 470, a forest threshold calculator 480, and a dynamic assignment module 490.

In some embodiments, an assignment module 450 receives a decision tree forest 360, then iterates through the graphs (e.g. decision trees) in the decision tree forest 360. In some cases, an assignment module 450 can use the results of a graph threshold calculator 470 to determine a corresponding graph threshold value 342 for each graph, and communicate the graph threshold value to the thread. A static assignment module 460 determines any one or more of the number of processors available, the number of cores available, the number of threads available and, from a calculation, also determines the number of threads to be used in the assignment of decision trees to threads. In some cases, the number of processors is given. The number of cores can be determined by polling the processor (or operating system, the operating having polled the processor) to determine the number of cores available in the processor, and in some cases, the number of threads can similarly be polled or calculated.

The assignment module 450 contains a forest threshold calculator 480. In some cases, execution of a successive tree to determine the contribution to an ad score 488 can only increase (i.e. not decrease) the ad score 488. In such situations it might be reasonable to stop execution of further decision trees from a particular forest once a particular forest threshold value 484 has been reached. The calculation of a forest threshold value 484 can be performed using a forest threshold calculator 480. Moreover, a forest threshold value 484 can be used in conjunction with a dynamic assignment module 490 to determine if a forest threshold value 484 has actually been reached as a result of the execution of decision trees by the threads. For example, a dynamic assignment module 490 is configured to receive a forest threshold value 484 (see path 482), and the dynamic assignment module 490 is configured to invoke execution of one or more threads on a core (see path 492), and to receive updates from one or more instances of a processor 410, each processor executing at least one thread. When, or if and when, the one or more instances of a processor 410 have reported updates (see path 494) to the extent that the forest threshold value 484 has been met or exceeded, then the dynamic assignment module 490 can terminate any previously-assigned threads, thus reducing the computing requirement for evaluating the decision tree forest 360.

As earlier described in the discussion of FIG. 2, a database of advertisements (e.g. one or more candidate ad sets 120) can be divided up, assigned to a plurality of candidate ad sets, and each advertisement falling into a given candidate ad set can be assigned for processing the corresponding decision tree forests (e.g. for ranking those ads using the decision trees). Further, additional exploitation of parallelization can be achieved by partitioning the decision trees forest such that a partition consists of a subset of decision trees such that each partition is mapped to a separate hardware thread. In another embodiment, each decision tree in a decision tree partition is mapped to a separate hardware thread, thereby enabling exploitation of yet another exploitation of parallelism.

In various embodiments, the number of partitions is determined based on the number of cores in a target system (e.g. in an advertisement server 108) and the number of decision trees in a decision tree forest. In some cases, a static assignment module 460 (or other module) can calculate or estimate a performance gain that could be achieved by a particular mapping. In some cases, the latency of assigning a partition having only a small number of decision trees can potentially be outweighed by the assignment and threading overhead.

Further, and to the discussion regarding how each partition is mapped to a particular hardware thread, in such a case, the tree scores 386 obtained by the execution of the decision trees in a partition can then be summed within a particular hardware thread. In still other embodiments, the summing operation can be implemented by using a suitable instruction or sequence of instructions (e.g. summing instructions from Intel Corporation's AVX® instruction set).

Figure 5A:
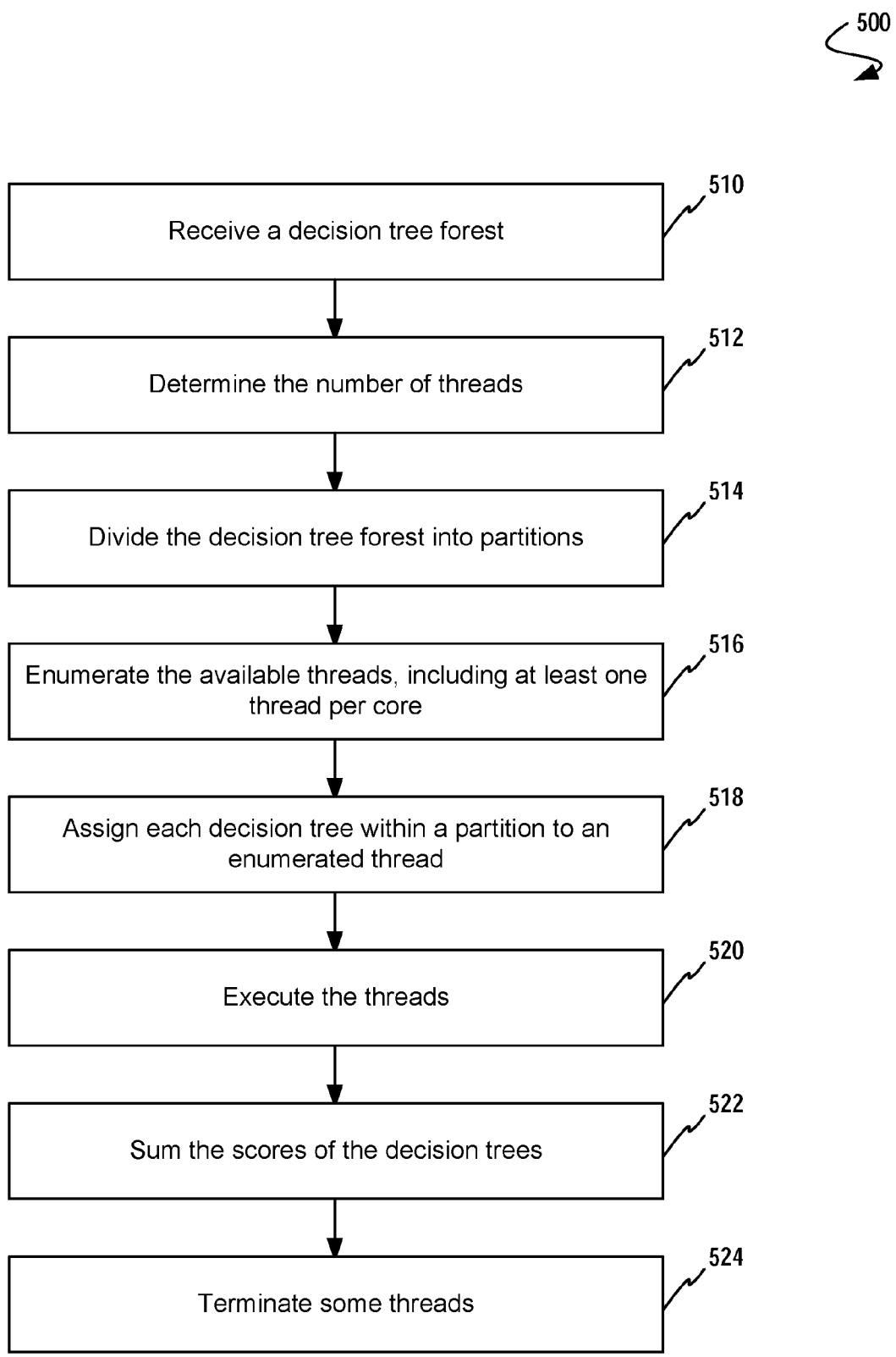
FIG. 5A depicts a method for practicing high performance personalized advertisement serving by exploiting thread assignments in a multiple core computing environment, according to one embodiment.

FIG. 5A depicts a method 500 for practicing high performance personalized advertisement serving by exploiting thread assignments in a multiple core computing environment. Of course, the method 500 is merely an exemplary embodiment. As shown, the method 500 comprises steps to receive a decision tree forest 360 (see operation 510) and, based at least in part on information from a processor 410, determine the number of threads to be considered in the assignment operation (see operation 512). Then, the operation 514 serves to divide the decision tree forest into partitions. Combining the results of an operation 512 and an operation 514, enumerate the available threads (see operation 516). Some embodiments may enumerate one thread per core, and some embodiments may enumerate multiple threads per core. Then, having characteristics of the partitions (and the decision trees therein), and having an assessment of the number of threads to be used, assign each decision tree within a partition to an enumerated thread (see operation 518). In some cases all decision trees within a partition are assigned to one particular thread. In other cases, individual decisions trees within a partition are assigned to individual threads. Of course, once at least one of the decision trees are assigned to a thread, then a supervisor (not shown) can cause the processor 410 to execute the threads (see operation 520). As the threads execute, traversing the decision trees, and updating the tree scores, then it is possible to sum the tree scores of the decision trees. The sum operation can be performed by a given thread, or a tree score can be sent to a module within an assignment module 450 (e.g. to dynamic assignment module 490, or to a static assignment module 460). In the event that a sum operation (see operation 522) meets or exceeds a threshold, it is sometimes possible to terminate some threads (see operation 524). Of course, any of a variety of modules (e.g. an assignment module 450) can account for the start of execution of a particular thread, and can also account for the processing status of the particular thread, and can further account for the tree score updates from the particular thread as well as any self-termination (e.g. completion) or early exit 344 of the particular thread.

Figure 5B:
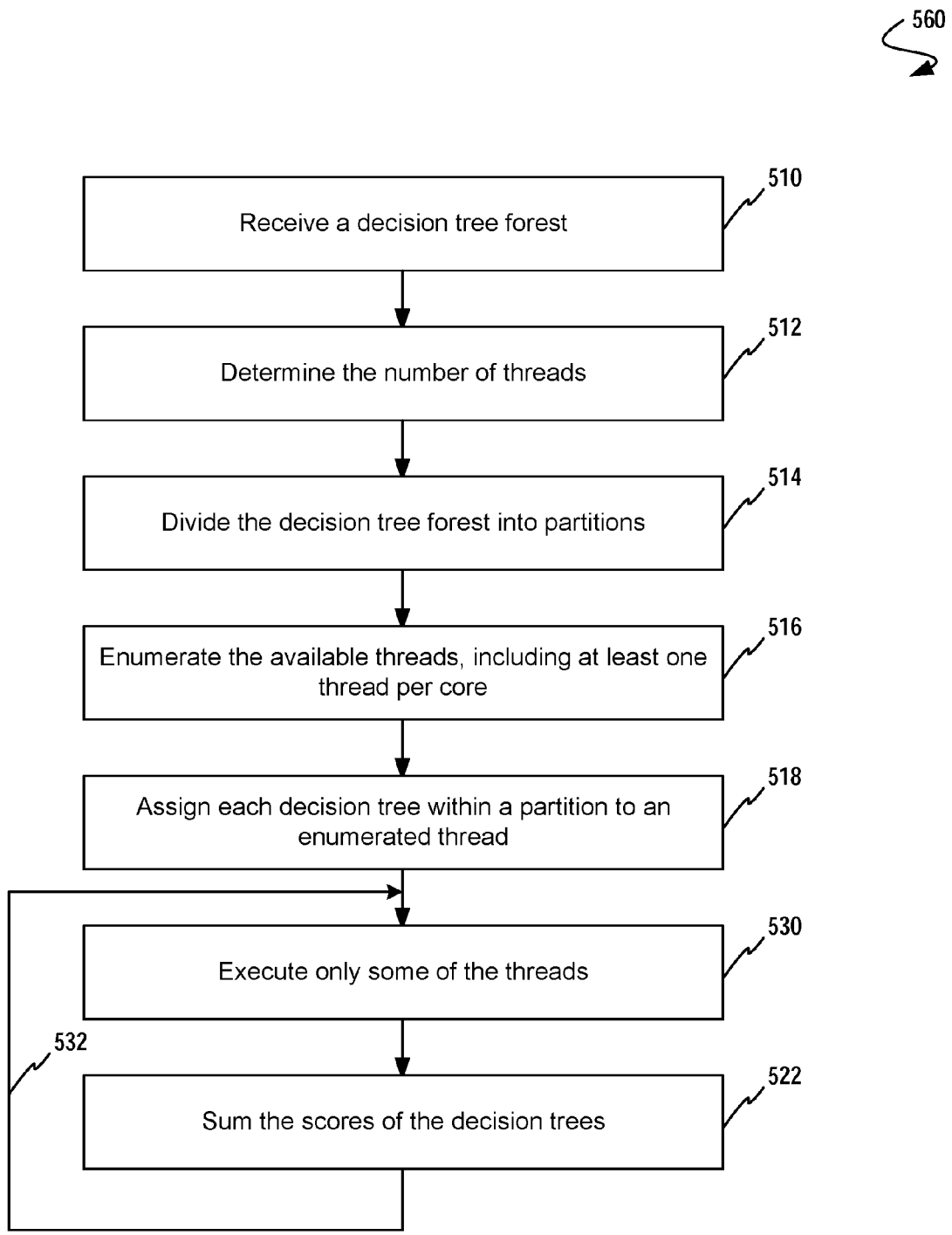
FIG. 5B depicts a method for practicing high performance personalized advertisement serving by exploiting thread assignments using a threshold in a multiple core computing environment, according to one embodiment.

FIG. 5B depicts a method 560 for practicing high performance personalized advertisement serving by exploiting thread assignments using a threshold in a multiple core computing environment. Of course, the method 560 is merely an exemplary embodiment. As shown, the method 560 comprises steps to receive a decision tree forest 360 (see operation 510), and perform other steps as discussed in FIG. 5A, and to assign each decision tree within a partition to an enumerated thread (see operation 518). In this embodiment, operation 530 serves to execute only some of the assigned threads in the expectation that not all assigned threads need be executed in order for the sum of tree scores to meet or exceed a forest threshold value 484; thus, when the operation to sum the tree scores of the decision trees (see operation 522) reports a value greater than a forest threshold value 484, then the method 560 can end. Otherwise, and as shown via path 532, method 560 returns to operation 530 in order to again execute only some of the assigned threads. Of course this loop can continue until such time as the sum of the tree scores of the decision trees (see operation 522) reports a value greater than a forest threshold value 484, or until such time as all of the assigned threads have executed to completion or have otherwise exited (e.g. via an early exit 344).

The determination to execute only some of the assigned threads can be made based on an execution rate assessment, possibly including a calculation of measured latency, or can be based on an assessment of how quickly the forest threshold value 484 is expected to be reached, or can be based on when completion of all of the assigned threads is expected to occur.

The operations involved to generate a forest threshold value 484 value can incorporate various commercial assessments. For example, reaching a forest threshold value 484 might be only one of several criteria to determine the ad or ads to display to the particular user. Another criteria might include the likelihood that the display of a particular ad is needed to achieve a guaranteed delivery metric. Or, the display of a particular digital advertisement might include an assessment (e.g. based on a value from a forecasting module 111) of the likelihood that such a particular user (e.g. a user satisfying specific user demographics 210) will occur within some time frame.

In some cases, the assessments can be based on learned curves. That is, the likelihood that a particular event might occur might vary linearly over an independent variable. Or it might vary according to an asymptotic function, or it might vary according to a parabolic function.

Parallelization of ad score computation(s) of ad relevance can reduce latency. Or, in some embodiments, parallelization of ad score computation(s) can be used to improve score precision. In such embodiments, decision trees of higher tree depth, or more complexity, or more number of internal and/or leaf nodes, can be used.

Using the techniques and structures described above, a system and/or a computer-implemented method for high performance advertisement serving by exploiting processor thread assignments in a processor having multiple threads can be implemented. For example, an ad server can be configured to receive digital advertisements, an instance of the digital advertisement corresponding to a plurality of decision trees, where the evaluation of a decision tree resulting in a tree score, and then determining the number of cores within the processor (e.g. by polling a processor within an ad server) in order to iteratively assign the next decision tree to be evaluated in the core, within which core the tree score is calculated. Multiple tree scores can be iteratively accumulated to form a tree score subtotal, and then, based at least in part on the tree score subtotal(s), a plurality of ads can be ranked (e.g. by comparing a first ad score of a digital advertisement against a second ad score of another digital advertisement).

In some environments, a core within a processor within an ad server can execute multiple threads, and the system can assign the next decision tree to be evaluated in a particular thread within a given core. In exemplary situations, the aforementioned thread-level exploitation can be combined with other parallelization techniques, for example where groups of digital advertisements are selected from a candidate ad set, and the groups are assigned to different ad servers.

Moreover, there are many ways to further reduce latency beyond the aforementioned techniques. For example, the decision trees can be selected to be assigned and executed in a particular execution order, and the execution order can be based on tree depth. Or, it is possible to further reduce latency by accumulating a plurality of tree scores only up to some threshold value, and then terminating the execution when the score subtotal is greater than the threshold value. Still, another technique to further reduce latency includes terminating the scheduling of further tree evaluation executions based on an execution rate assessment.

Figure 6:
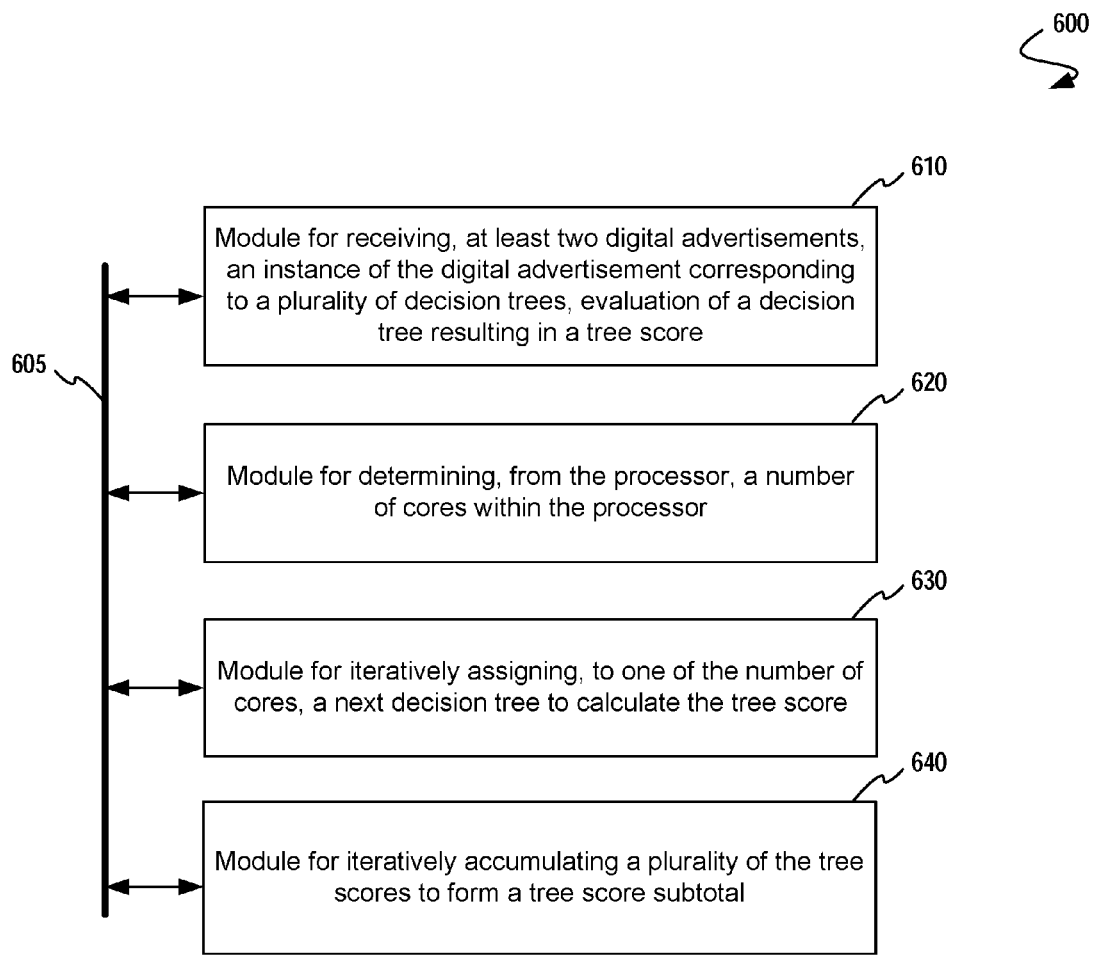
FIG. 6 depicts a block diagram of a system for high performance personalized advertisement serving by exploiting thread assignments in a multiple core computing environment, according to one embodiment.

FIG. 6 depicts a block diagram of a system for high performance personalized advertisement serving by exploiting thread assignments in a multiple core computing environment. As an option, the present system 600 may be implemented in the context of the architecture and functionality of the embodiments described herein. Of course, however, the system 600 or any operation therein may be carried out in any desired environment. As shown, system 600 comprises a plurality of modules, a module comprising at least one processor and a memory, each connected to a communication link 605, and any module can communicate with other modules over communication link 605. The modules of the system can, individually or in combination, perform method steps within system 600. Any method steps performed within system 600 may be performed in any order unless as may be specified in the claims. As shown, system 600 comprises modules for: receiving, at least two digital advertisements, an instance of the digital advertisement corresponding to a plurality of decision trees, evaluation of a decision tree resulting in a tree score (see module 610); determining, from the processor, a number of cores within the processor (see module 620); iteratively assigning, to one of the number of cores, a next decision tree to calculate the tree score (see module 630); and iteratively accumulating a plurality of the tree scores to form a tree score subtotal (see module 640).

FIG. 7 is a diagrammatic representation of a network 700, including nodes for client computer systems $702_1$ through $702_N$, nodes for server computer systems $704_1$ through $704_N$, and nodes for network infrastructure $706_1$ through $706_N$, any of which nodes may comprise a machine (e.g. computer 750) within which a set of instructions for causing the machine to perform any one of the techniques discussed above may be executed. The embodiment shown is purely exemplary, and might be implemented in the context of one or more of the figures herein.

Any node of the network 700 may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system (e.g. computer 750) includes a processor 708 (e.g. a processor core, a microprocessor, a computing device, etc), a main memory (e.g. computer memory 710), and a static memory 712, which communicate with each other via a bus 714. The computer 750 may further include a display unit (e.g. computer display 716) that may comprise a touch-screen, or a liquid crystal display (LCD), or a light emitting diode (LED) display, or a cathode ray tube (CRT). As shown, the computer system also includes a human input/output (I/O) device 718 (e.g. a keyboard, an alphanumeric keypad, etc), a pointing device 720 (e.g. a mouse, a touch screen, etc), a drive unit 722 (e.g. a disk drive unit, a CD/DVD drive, a tangible computer readable removable media drive, an SSD storage device, etc), a signal generation device 728 (e.g. a speaker, an audio output, etc), and a network interface device 730 (e.g. an Ethernet interface, a wired network interface, a wireless network interface, a propagated signal interface, etc). The drive unit 722 includes a machine-readable medium 724 on which is stored a set of instructions (i.e. software, firmware, middleware, etc) 726 embodying any one, or all, of the methodologies described above. The set of instructions 726 is also shown to reside, completely or at least partially, within the main memory and/or within the processor 708. The set of instructions 726 may further be transmitted or received via the network interface device 730 over the bus 714.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; and electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A computer-implemented method for high performance advertisement serving by exploiting processor thread assignments in a processor having multiple threads, the method comprising:
   receiving, in memory, at least two digital advertisements, an instance of the digital advertisement corresponding to a plurality of decision trees, evaluation of a decision tree resulting in a tree score;
   determining, from the processor, a number of cores within the processor;
   iteratively assigning, to a next one of the number of cores, a next decision tree to calculate the tree score; and iteratively accumulating a plurality of the tree scores to form a tree score subtotal, wherein iteratively accumulating a plurality of tree scores to form a tree score subtotal terminates when the tree score subtotal is greater than a tree score subtotal threshold, based in part on an execution rate assessment.

2. The method of claim 1, further comprising: ranking a first of the at least two digital advertisements against a second of the at least two digital advertisements.

3. The method of claim 1, wherein one core selected from the number of cores executes multiple threads.

4. The method of claim 1, wherein the at least two digital advertisements are selected from a candidate ad set.

5. The method of claim 1, wherein the plurality of decision trees are selected in an execution order from a decision tree forest, the execution order determined in part by a tree depth.

6. The method of claim 1, wherein the step of iteratively accumulating a plurality of tree scores is terminated when the tree score subtotal is greater than a graph threshold value.

7. The method of claim 1, wherein the step of iteratively accumulating a score subtotal is terminated based on an execution rate assessment.

8. An advertising server network implementing high performance advertisement serving by exploiting processor thread assignments in a processor having multiple threads comprising: a module for receiving, at least two digital advertisements, an instance of the digital advertisement corresponding to a plurality of decision trees, evaluation of a decision tree resulting in a tree score; a module for determining, from the processor, a number of cores within the processor; a module for iteratively assigning, to a next one of the number of cores, a next decision tree to calculate the tree score; and a module for iteratively accumulating a plurality of the tree scores to form a tree score subtotal, wherein iteratively accumulating a plurality of tree scores to form a tree score subtotal terminates when the tree score subtotal is greater than a tree score subtotal threshold, based in part on an execution rate assessment.

9. The advertising server network of claim 8, further comprising: a module for ranking a first of the at least two digital advertisements against a second of the at least two digital advertisements.

10. The advertising server network of claim 8, wherein one core selected from the number of cores executes multiple threads.

11. The advertising server network of claim 8, wherein the at least two digital advertisements are selected from a candidate ad set.

12. The advertising server network of claim 8, wherein the plurality of decision trees are selected in an execution order from a decision tree forest, the execution order determined in part by a tree depth.

13. The advertising server network of claim 8, wherein the step of iteratively accumulating a plurality of tree scores is terminated when the tree score subtotal is greater than a graph threshold value.

14. The advertising server network of claim 8, wherein the step of iteratively accumulating a score subtotal is terminated based on an execution rate assessment.

15. A non-transitory computer readable medium comprising a set of instructions which, when executed by a computer, cause the computer to implement high performance advertisement serving by exploiting processor thread assignments in a processor having multiple threads, the set of instructions for:
receiving, at least two digital advertisements, an instance of the digital advertisement corresponding to a plurality of decision trees, evaluation of a decision tree resulting in a tree score;
determining, from the processor, a number of cores within the processor;
iteratively assigning, to a next one of the number of cores, a next decision tree to calculate the tree score; and
iteratively accumulating a plurality of the tree scores to form a tree score subtotal, wherein iteratively accumulating a plurality of tree scores to form a tree score subtotal terminates when the tree score subtotal is greater than a tree score subtotal threshold, based in part on an execution rate assessment.

16. The non-transitory computer readable medium of claim 15, further comprising: instructions for ranking a first of the at least two digital advertisements against a second of the at least two digital advertisements.

17. The non-transitory computer readable medium of claim 15, wherein one core selected from the number of cores executes multiple threads.

18. The non-transitory computer readable medium of claim 15, wherein the plurality of decision trees are selected in an execution order from a decision tree forest, the execution order determined in part by a tree depth.

19. The non-transitory computer readable medium of claim 15, wherein the step of iteratively accumulating a plurality of tree scores is terminated when the tree score subtotal is greater than a graph threshold value.

20. The non-transitory computer readable medium of claim 15, wherein the step of iteratively accumulating a score subtotal is terminated based on an execution rate assessment.

* * * * *